United States Patent
Michel et al.

(10) Patent No.: US 7,817,875 B2
(45) Date of Patent: Oct. 19, 2010

(54) IMAGE PROCESSING APPARATUS AND METHOD, RECORDING MEDIUM, AND PROGRAM

(75) Inventors: Xavier Michel, Chiba (JP); Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 11/671,254

(22) Filed: Feb. 5, 2007

(65) Prior Publication Data

US 2008/0181529 A1 Jul. 31, 2008

(30) Foreign Application Priority Data

Feb. 7, 2006 (JP) .............................. P2006-029506

(51) Int. Cl.
*G06K 9/38* (2006.01)
*G06K 9/40* (2006.01)

(52) U.S. Cl. ....................... 382/274; 382/266; 382/275; 382/261

(58) Field of Classification Search .......... 382/260–275
See application file for complete search history.

(56) References Cited

U.S. PATENT DOCUMENTS

| 6,731,823 | B1 | 5/2004 | Gallagher |
| 6,956,582 | B2 * | 10/2005 | Tidwell ........................ 345/611 |
| 7,437,013 | B2 * | 10/2008 | Anderson .................... 382/261 |

FOREIGN PATENT DOCUMENTS

EP 1 486 916 12/2004

OTHER PUBLICATIONS

International Search Report dated May 31, 2007.

* cited by examiner

*Primary Examiner*—Wes Tucker
(74) *Attorney, Agent, or Firm*—Sonnenschein Nath & Rosenthal LLP

(57) ABSTRACT

An image processing apparatus including a contrast detector that detects a contrast intensity of a pixel in a first image; a flat-intensity detector that detects a flat intensity of the pixel; an edge-intensity detector that detects an edge intensity of the pixel; a flat-weight setter that sets a flat weight for the pixel; an edge-weight setter that sets an edge weight for the pixel; an attenuator that attenuates components in a predetermined frequency band of the first image to form a second image; a first combiner that combines the first and second images to form a third image using weights based on the flat weight; an edge enhancer that enhances edges in the third image to form a fourth image; and a second combiner that combines the first and fourth images using weights based on the edge weight.

10 Claims, 17 Drawing Sheets

IMAGE PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2006-029506 filed in the Japanese Patent Office on Feb. 7, 2006, the entire contents of which are incorporated herein by reference.

BACKGROUND OF THE INVENTION

1. Field of the Invention

The present invention relates to image processing apparatuses and methods, recording media, and programs. More specifically, the present invention relates to an image processing apparatus and method, a recording medium, and a program for enhancing sharpness of edges in an image while alleviating noise enhancement.

2. Description of the Related Art

Methods of edge enhancement for enhancing sharpness of edges in an image have hitherto been proposed. However, with existing edge enhancement techniques, in some cases, noise in the vicinity of an edge (e.g., mosquito noise caused by image compression or random noise) is enhanced together with the edge. For example, when a region where the pixel value changes as shown in FIG. 1 exists in an image before edge enhancement, the pixel value changes as shown in FIG. 2 in a corresponding region of an image obtained as a result of edge enhancement using existing techniques. In a region D$2a$ shown in FIG. 2 corresponding to a region D$1a$ shown in FIG. 1, the pixel value changes with a larger gradient than in the region D$1a$, so that an edge is enhanced. However, in regions in the vicinity of the edge, i.e., in regions D$2b$ and D$2c$ shown in FIG. 2 corresponding to regions D$1b$ and D$1c$ shown in FIG. 1, small fluctuation in the pixel value is amplified.

In a method proposed to avoid degradation in image quality caused by edge enhancement, high-frequency components of an input image are extracted, edges are detected from the high-frequency components, edge frequencies are analyzed, frequencies found by the analysis are modulated, and edge pixels are generated on the basis of the result of the frequency modulation. This serves to enhance edges while alleviating degradation in image quality due to overshoot, undershoot, or the like. Such a method is described, for example, in Japanese Unexamined Patent Application Publication No. 2005-260534.

SUMMARY OF THE INVENTION

However, the method described in Japanese Unexamined Patent Application Publication No. 2005-260534 involves complex processing, such as analysis of detected edge frequencies and frequency modulation.

It is desired that sharpness of edges in an image can be readily enhanced while alleviating noise enhancement.

According to an embodiment of the present invention, there is provided an image processing apparatus including contrast detecting means for detecting a contrast intensity of a target pixel being considered in a first image, the contrast intensity indicating an intensity of contrast in a region including and neighboring the target pixel; flat-intensity detecting means for detecting a flat intensity of the target pixel on the basis of the contrast intensity, the flat intensity indicating a degree of smallness of change in pixel value relative to change in position in the region including and neighboring the target pixel; edge-intensity detecting means for detecting an edge intensity of the target pixel on the basis of the contrast intensity, the edge intensity indicating a degree of largeness of change in pixel value relative to change in position in the region including and neighboring the target pixel; flat-weight setting means for setting a flat weight for the target pixel, the flat weight being a weight that increases as flat intensities of pixels in the region including and neighboring the target pixel increase and that decreases as the flat intensities decrease; edge-weight setting means for setting an edge weight for the target pixel, the edge weight being a weight that increases as edge intensities of the pixels in the region including and neighboring the target pixel increase and that decreases as the edge intensities decrease; attenuating means for attenuating components in a predetermined frequency band of the first image to form a second image; first combining means for combining the first image and the second image to form a third image by adding together pixel values of pixels at corresponding positions of the first image and the second image, using weights that are based on the flat weight; edge enhancing means for enhancing edges in the third image to form a fourth image; and second combining means for combining the first image and the fourth image by adding together pixel values of pixels at corresponding positions of the first image and the fourth image, using weights that are based on the edge weight.

As the contrast intensity, the contrast detector may detect a sum of values obtained for individual pairs of adjacent pixels in the region including and neighboring the target pixel, the values being obtained by, for each of the pairs of adjacent pixels, multiplying an absolute value of difference between pixel values of the pixels with a weight associated with a distance between the pixels.

The flat intensity may be a value that takes on a maximum value when the contrast intensity is less than a first threshold, that decreases as the contrast intensity increases when the contrast intensity is greater than or equal to the first threshold and less than or equal to a second threshold, and that takes on a minimum value when the contrast intensity is greater than the second threshold. Furthermore, the edge intensity may be a value that takes on a minimum value when the contrast intensity is less than a third threshold, that increases as the contrast intensity increases when the contrast intensity is greater than or equal to the third threshold and less than or equal to a fourth threshold, and that takes on a maximum value when the contrast intensity is greater than the fourth threshold.

As the flat weight, the flat-weight setting means may set a sum of values obtained for the individual pixels in the region including and neighboring the target pixel, the values being obtained by, for each of the pixels, multiplying the flat intensity with a weight associated with a distance between the pixel and the target pixel. Furthermore, as the edge weight, the edge-weight setting means may set a sum of values obtained for the individual pixels in the region including and neighboring the target pixel, the values being obtained by, for each of the pixels, multiplying the edge intensity with a weight associated with a distance between the pixel and the target pixel.

The attenuating means may attenuate components in a high-frequency band of the first image.

The first combining means may add together the pixel values of the pixels at the corresponding positions of the first image and the second image with a ratio of the pixel value of the second image increased as the flat weight increases and with a ratio of the pixel value of the first image increased as the flat weight decreases. Furthermore, the second combining means may add together the pixel values of the pixels at the corresponding positions of the first image and the fourth image with a ratio of the pixel value of the fourth image increased as the edge weight increases and with a ratio of the pixel value of the first image increased as the edge weight decreases.

According to another embodiment of the present invention, there is provided an image processing method, a program, or a recording medium having recorded the program thereon, the image processing method or the program including the steps of detecting a contrast intensity of a target pixel being considered in a first image, the contrast intensity indicating an intensity of contrast in a region including and neighboring the target pixel; detecting a flat intensity of the target pixel on the basis of the contrast intensity, the flat intensity indicating a degree of smallness of change in pixel value relative to change in position in the region including and neighboring the target pixel; detecting an edge intensity of the target pixel on the basis of the contrast intensity, the edge intensity indicating a degree of largeness of change in pixel value relative to change in position in the region including and neighboring the target pixel; setting a flat weight for the target pixel, the flat weight being a weight that increases as flat intensities of pixels in the region including and neighboring the target pixel increase and that decreases as the flat intensities decrease; setting an edge weight for the target pixel, the edge weight being a weight that increases as edge intensities of the pixels in the region including and neighboring the target pixel increase and that decreases as the edge intensities decrease; attenuating components in a predetermined frequency band of the first image to form a second image; combining the first image and the second image to form a third image by adding together pixel values of pixels at corresponding positions of the first image and the second image, using weights that are based on the flat weight; enhancing edges in the third image to form a fourth image; and combining the first image and the fourth image by adding together pixel values of pixels at corresponding positions of the first image and the fourth image, using weights that are based on the edge weight.

According to these embodiments of the present invention, a contrast intensity of a target pixel being considered in a first image is detected, the contrast intensity indicating an intensity of contrast in a region including and neighboring the target pixel; a flat intensity of the target pixel is detected on the basis of the contrast intensity, the flat intensity indicating a degree of smallness of change in pixel value relative to change in position in the region including and neighboring the target pixel; an edge intensity of the target pixel is detected on the basis of the contrast intensity, the edge intensity indicating a degree of largeness of change in pixel value relative to change in position in the region including and neighboring the target pixel; a flat weight for the target pixel is set, the flat weight being a weight that increases as flat intensities of pixels in the region including and neighboring the target pixel increase and that decreases as the flat intensities decrease; an edge weight for the target pixel is set, the edge weight being a weight that increases as edge intensities of the pixels in the region including and neighboring the target pixel increase and that decreases as the edge intensities decrease; components in a predetermined frequency band of the first image are attenuated to form a second image; the first image and the second image are combined to form a third image by adding together pixel values of pixels at corresponding positions of the first image and the second image, using weights that are based on the flat weight; edges in the third image are enhanced to form a fourth image; and the first image and the fourth image are combined by adding together pixel values of pixels at corresponding positions of the first image and the fourth image, using weights that are based on the edge weight.

According to these embodiments of the present invention, it is possible to enhance sharpness of edges in an image. Furthermore, it is possible to readily enhance edge sharpness while alleviating noise enhancement.

DESCRIPTION OF THE PREFERRED EMBODIMENTS

Figure 1:
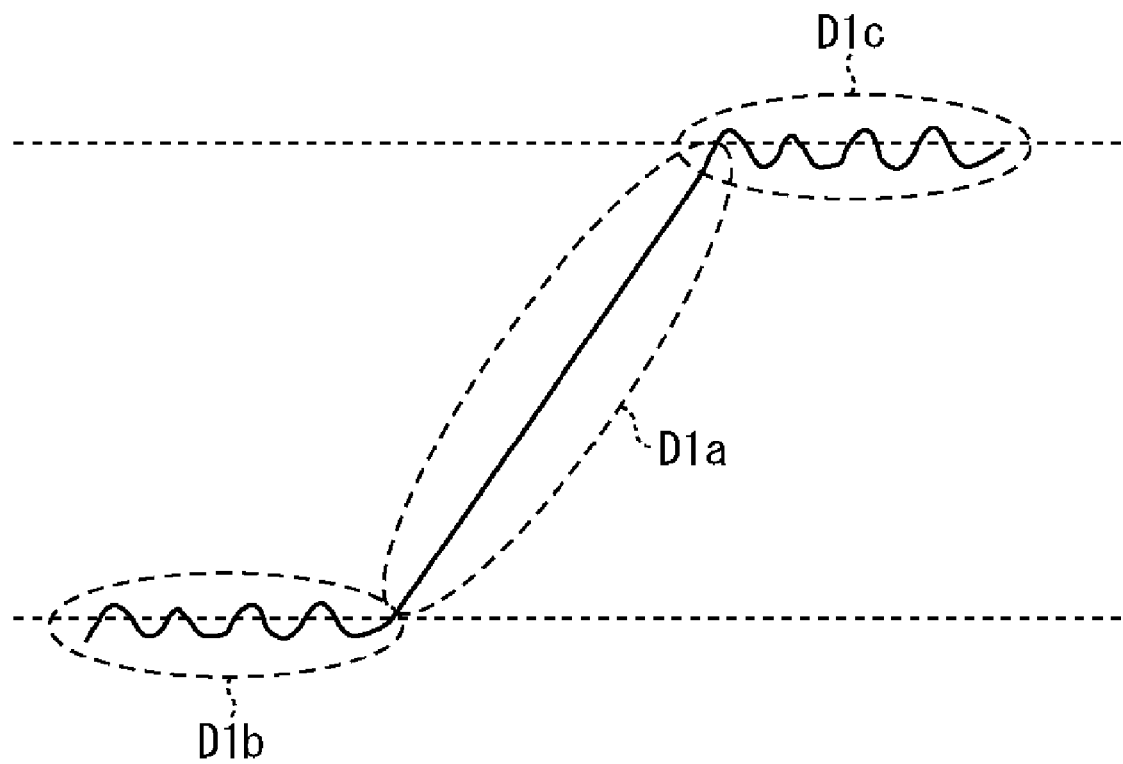
FIG. 1 is a graph showing an example of change in pixel value in an input image.
Figure 2:
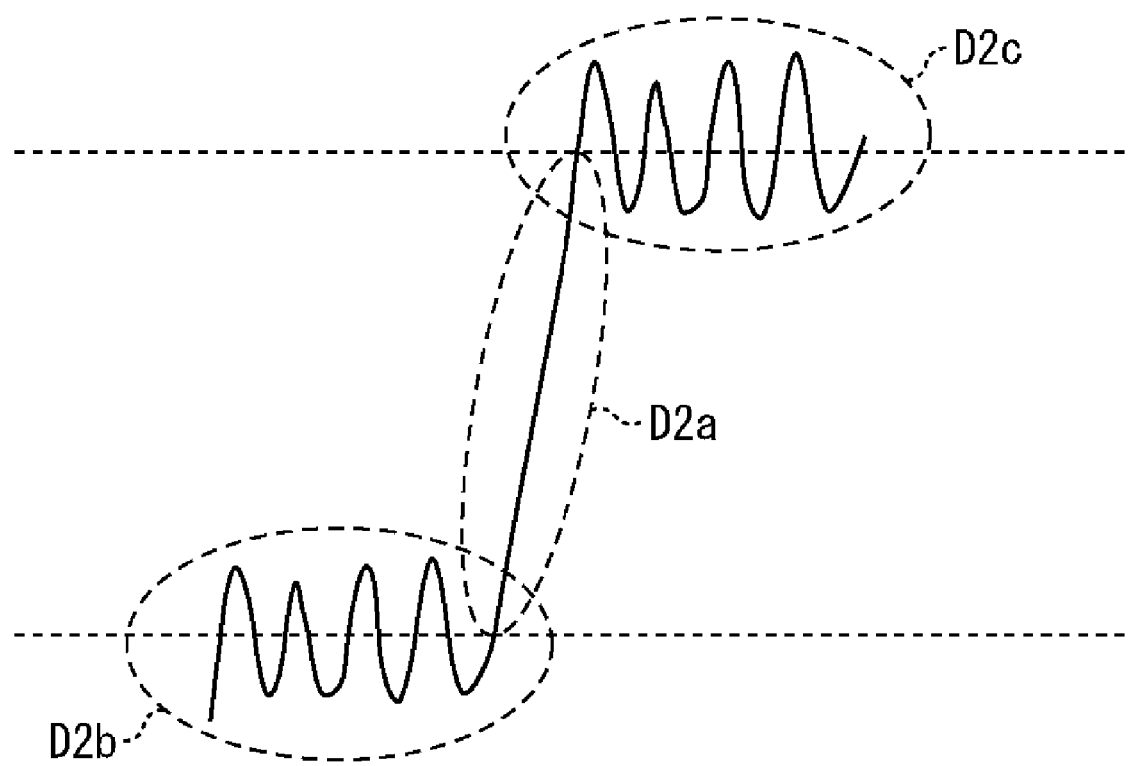
FIG. 2 is a graph showing an example of change in pixel value in an image in which edges have been enhanced using existing techniques.

Before describing embodiments of the present invention, examples of corresponding relationship between the features of the present invention and the embodiments described in this specification and shown in the drawings will be described below. This description is intended to ensure that embodiments supporting the present invention are described in this specification. Thus, even if a certain embodiment is not described herein as corresponding to certain features of the present invention, that does not necessarily mean that the embodiment does not correspond to those features. Conversely, even if an embodiment is described herein as corresponding to certain features, that does not necessarily mean that the embodiment does not correspond to other features.

An image processing apparatus (e.g., an image processing unit 12 shown in FIG. 3) according to an embodiment of the present invention includes contrast detecting means (e.g., a contrast calculator 51 shown in FIG. 4) for detecting a contrast intensity of a target pixel being considered in a first image (e.g., an input image), the contrast intensity indicating an intensity of contrast in a region including and neighboring the target pixel; flat-intensity detecting means (e.g., a flat-intensity detector 52 shown in FIG. 4) for detecting a flat intensity of the target pixel on the basis of the contrast intensity, the flat intensity indicating a degree of smallness of change in pixel value relative to change in position in the region including and neighboring the target pixel; edge-intensity detecting means (e.g., an edge-intensity detector 54 shown in FIG. 4) for detecting an edge intensity of the target pixel on the basis of the contrast intensity, the edge intensity indicating a degree of largeness of change in pixel value relative to change in position in the region including and neighboring the target pixel; flat-weight setting means (e.g., a flat-intensity-information generator 53 shown in FIG. 4) for setting a flat weight for the target pixel, the flat weight being a weight that increases as flat intensities of pixels in the region including and neighboring the target pixel increase and that decreases as the flat intensities decrease; edge-weight setting means (e.g., an edge-intensity-information generator 55 shown in FIG. 4) for setting an edge weight for the target pixel, the edge weight being a weight that increases as edge intensities of the pixels in the region including and neighboring the target pixel increase and that decreases as the edge intensities decrease; attenuating means (e.g., a flat filter 81 shown in FIG. 5) for attenuating components in a predetermined frequency band of the first image to form a second image (e.g., a flat image); first combining means (e.g., an adaptive flat mixer 82 shown in FIG. 5) for combining the first image and the second image to form a third image (e.g., a flat-mixture image) by adding together pixel values of pixels at corresponding positions of the first image and the second image, using weights that are based on the flat weight; edge enhancing means (e.g., an edge filter 83 shown in FIG. 5) for enhancing edges in the third image to form a fourth image (e.g., an edge image); and second combining means (e.g., an adaptive edge mixer 84 shown in FIG. 5) for combining the first image and the fourth image by adding together pixel values of pixels at corresponding positions of the first image and the fourth image, using weights that are based on the edge weight.

An image processing method, a program, or a recording medium having recorded the program thereon according to another embodiment of the present invention includes the steps of detecting a contrast intensity of a target pixel being considered in a first image (e.g., an input image) (e.g., step S51 shown in FIG. 7), the contrast intensity indicating an intensity of contrast in a region including and neighboring the target pixel; detecting a flat intensity of the target pixel on the basis of the contrast intensity (e.g., step S52 shown in FIG. 7), the flat intensity indicating a degree of smallness of change in pixel value relative to change in position in the region including and neighboring the target pixel; detecting an edge intensity of the target pixel on the basis of the contrast intensity (e.g., step S53 shown in FIG. 7), the edge intensity indicating a degree of largeness of change in pixel value relative to change in position in the region including and neighboring the target pixel; setting a flat weight for the target pixel (e.g. step S55 shown in FIG. 7), the flat weight being a weight that increases as flat intensities of pixels in the region including and neighboring the target pixel increase and that decreases as the flat intensities decrease; setting an edge weight for the target pixel (e.g., step S56 shown in FIG. 7), the edge weight being a weight that increases as edge intensities of the pixels in the region including and neighboring the target pixel increase and that decreases as the edge intensities decrease; attenuating components in a predetermined frequency band of the first image to form a second image (e.g., step S101 shown in FIG. 9); combining the first image and the second image to form a third image (e.g., step S102 shown in FIG. 9) by adding together pixel values of pixels at corresponding positions of the first image and the second image, using weights that are based on the flat weight; enhancing edges in the third image to form a fourth image (e.g., step S103 shown in FIG. 9); and combining the first image and the fourth image (e.g., step S104 shown in FIG. 9) by adding together pixel values of pixels at corresponding positions of the first image and the fourth image, using weights that are based on the edge weight.

Now, embodiments of the present invention will be described with reference to the drawings.

Figure 3:
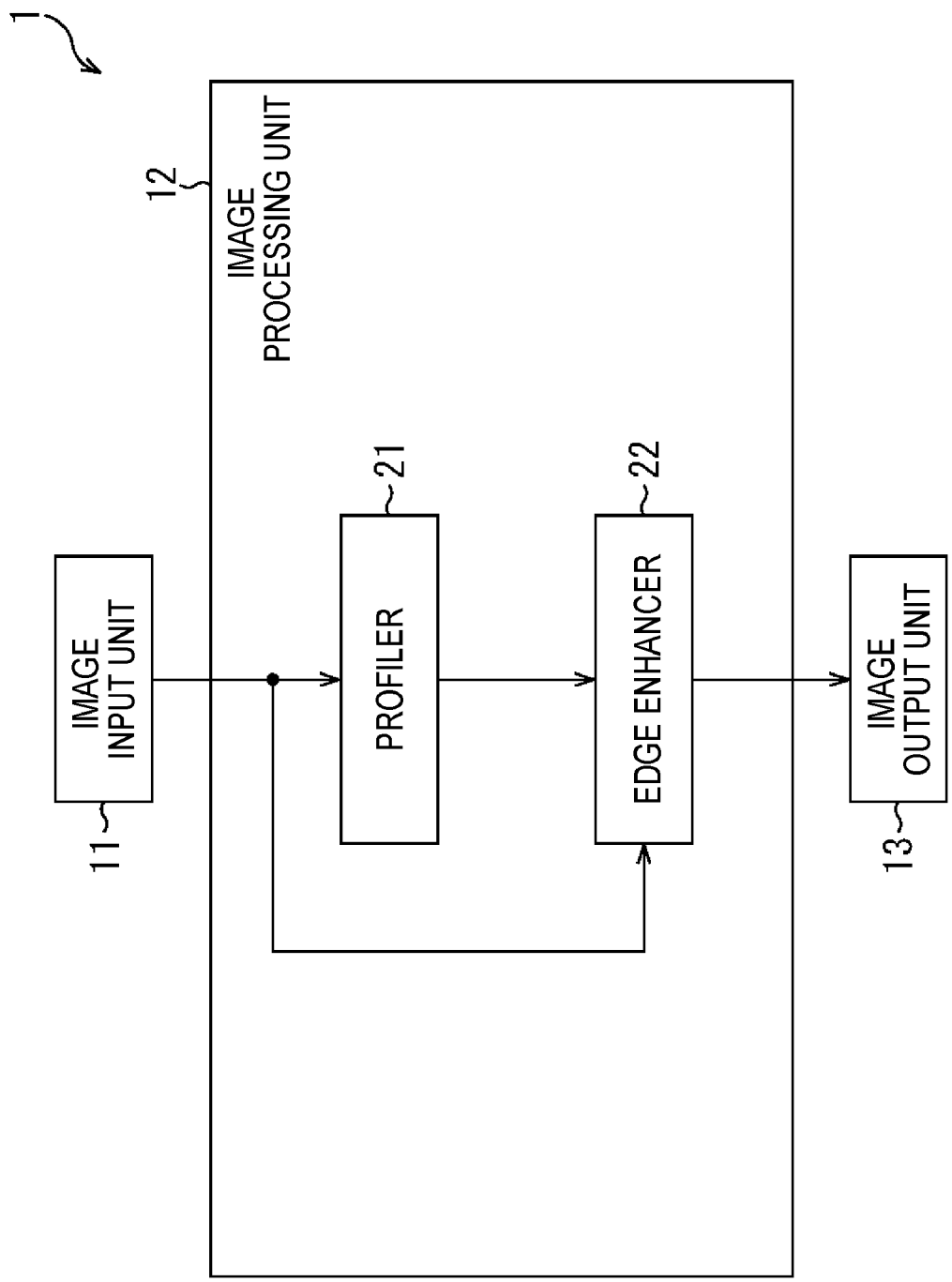
FIG. 3 is a block diagram of an image processing apparatus according to an embodiment of the present invention.

FIG. 3 is a block diagram showing an image processing apparatus according to an embodiment of the present invention. An image processing apparatus 1 according to this embodiment includes an image input unit 11, an image processing unit 12, and an image output unit 13.

The image input unit 11 inputs an image that is to be processed (hereinafter referred to as an input image), e.g., an image read from a recording medium or an image transmitted from an external device via a network, to the image processing unit 12.

The image processing unit 12 enhances sharpness of edges in the image through edge enhancement or edge correction. The image processing unit 12 includes a profiler 21 and an edge enhancer 22.

Figure 7:
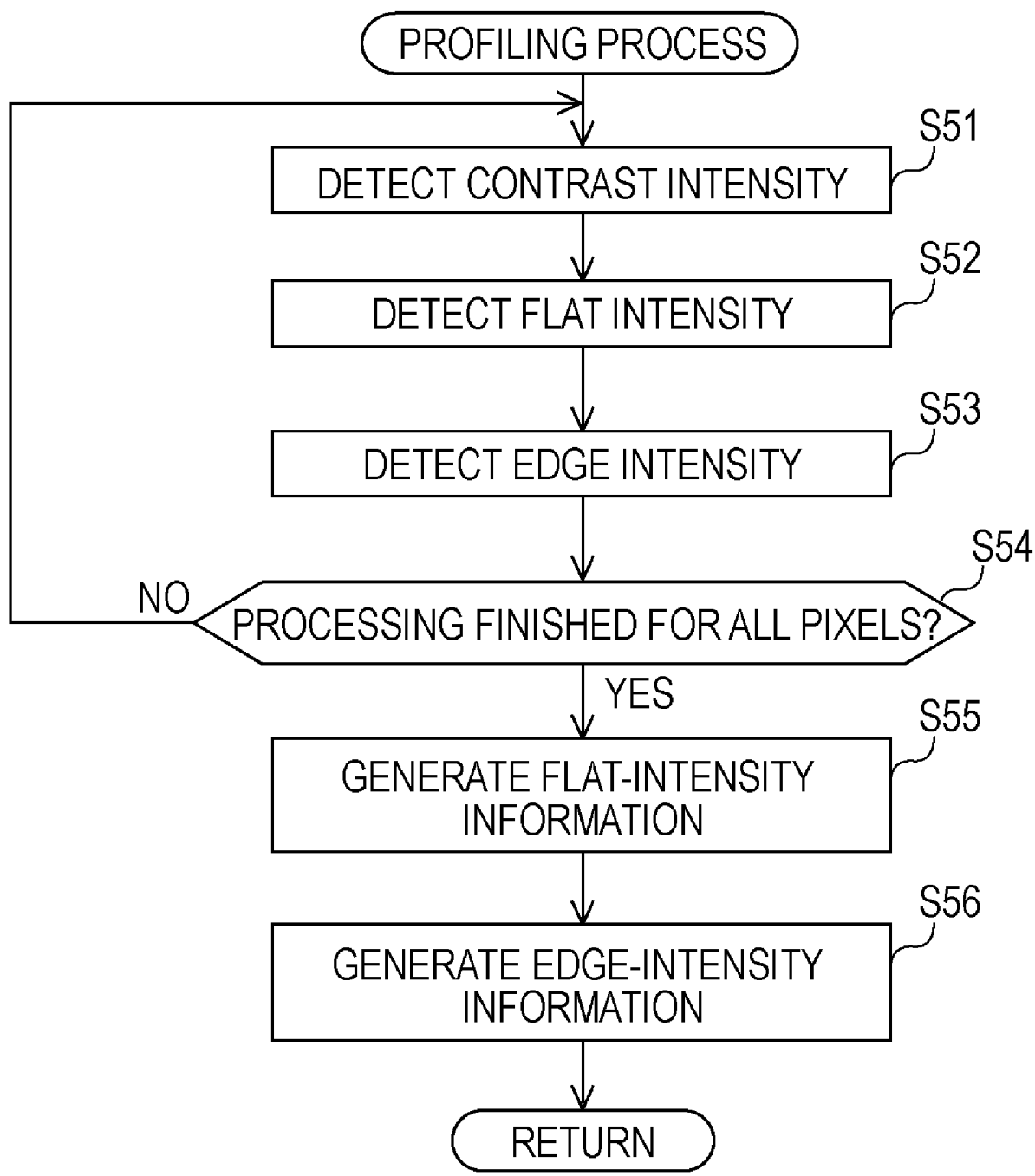
FIG. 7 is a flowchart showing details of a profiling process executed in step S1 shown in FIG. 6.

The profiler 21 executes a profiling process, which will be described later with reference to FIG. 7. More specifically, the profiler 21 detects a flat intensity and an edge intensity of the input image. The flat intensity refers to a degree of smallness of change in pixel value in a region of including and neighboring a pixel being considered for processing (hereinafter referred to as a target pixel). The flat intensity increases as the change in pixel value decreases, and the flat intensity decreases as the change in pixel value increases. The edge intensity refers to a degree of largeness of change in pixel value relative to change in position in the region including and neighboring the target pixel. The edge intensity increases as the change in pixel value increases, and the edge intensity decreases as the change in pixel value decreases.

Furthermore, the profiler 21 calculates weight_flat, which is a weight based on the flat intensity, and weight_edge, which is a weight based on the edge intensity. The profiler 21 supplies flat-intensity information indicating weight_flat and edge-intensity information indicating weight_edge to the edge enhancer 22.

Figure 9:
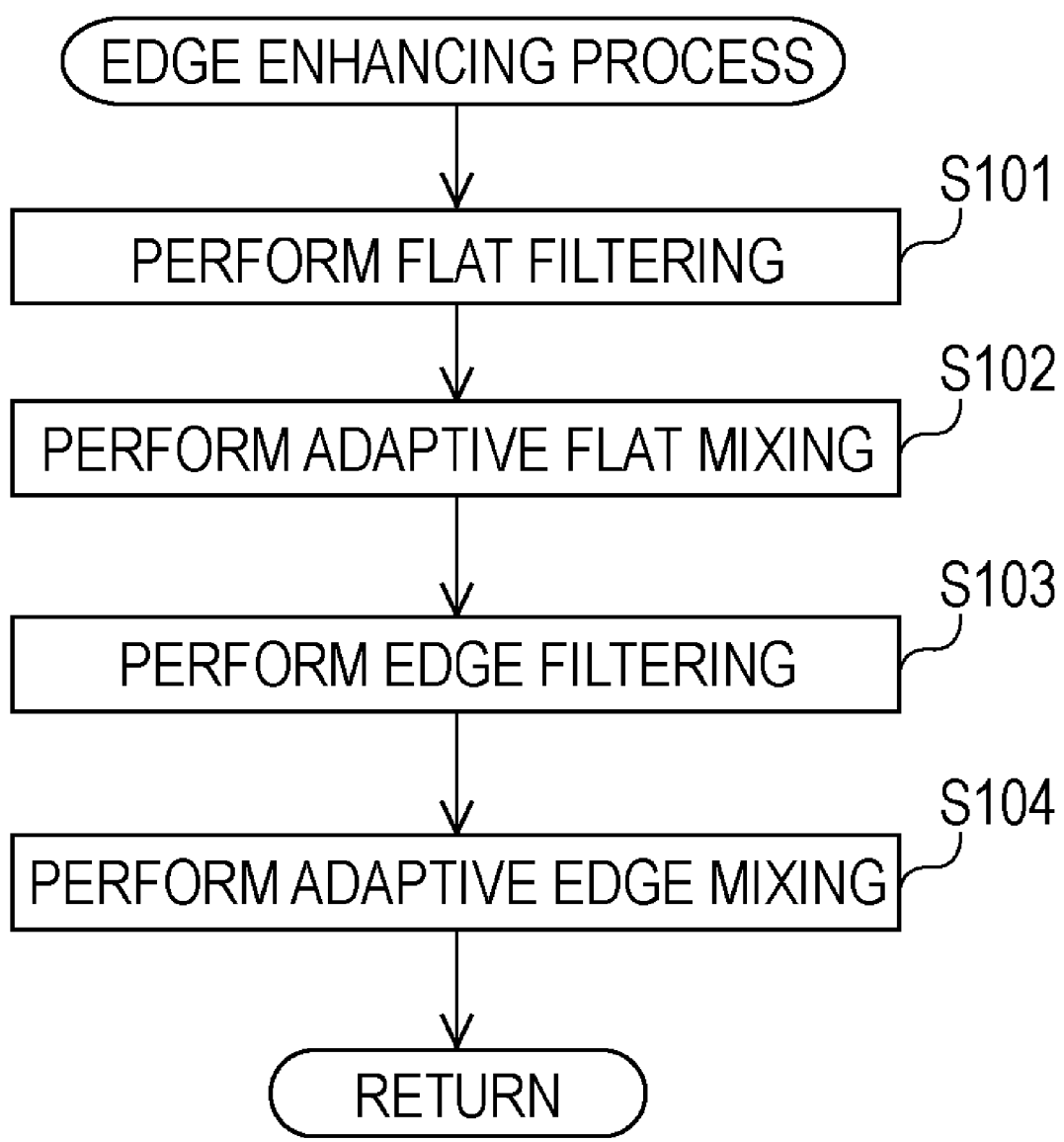
FIG. 9 is a flowchart showing details of an edge enhancing process executed in step S2 shown in FIG. 6.

As will be described later mainly with reference to FIG. 9, the edge enhancer 22 executes an edge enhancing process to enhance or correct edges in an input image. The edge enhancer 22 supplies an image obtained through the edge enhancing process to the image output unit 13.

For example, the image output unit 13 displays the image supplied from the image processing unit 12 on a display (not shown), records the image on a recording medium, or sends the image to another apparatus via a transmission medium.

Figure 4:
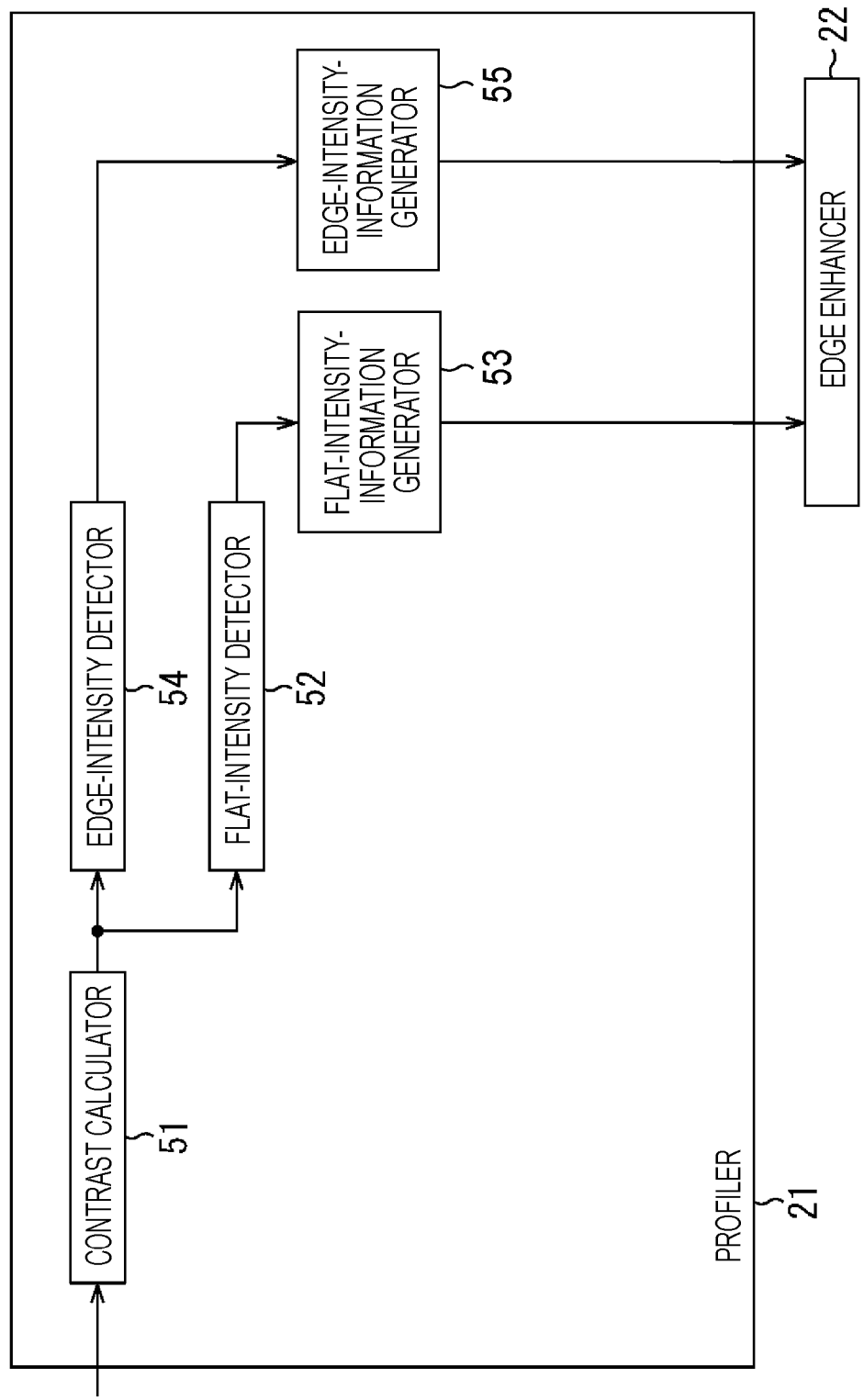
FIG. 4 is a block diagram showing an example functional configuration of a profiler shown in FIG. 3.

FIG. 4 is a block diagram showing an example functional configuration of the profiler 21. The profiler 21 includes a contrast calculator 51, a flat-intensity detector 52, a flat-intensity-information generator 53, an edge-intensity detector 54, and an edge-intensity-information generator 55.

As will be described later with reference to FIG. 7, the contrast calculator 51 detects a contrast intensity for each pixel of an input image, the contrast intensity indicating an intensity of contrast in a region including and neighboring the pixel. The contrast calculator 51 supplies contrast information indicating the contrast intensity to the flat-intensity detector 52 and the edge-intensity detector 54.

As will be described later with reference to FIG. 7, the flat-intensity detector 52 detects a flat intensity for each pixel of the input image on the basis of the contrast information. The flat-intensity detector 52 supplies information indicating the flat intensity to the flat-intensity-information generator 53.

As will be described later with reference to FIG. 7, the flat-intensity-information generator 53 calculates weight_flat for each pixel of the input image, weight_flat being a weight based on the flat intensity. The flat-intensity-information generator 53 supplies flat-intensity information indicating weight_flat to the edge enhancer 22.

As will be described later with reference to FIG. 7, the edge-intensity detector 54 detects an edge intensity for each pixel of the input image on the basis of the contrast information. The edge-intensity detector 54 supplies information indicating the edge intensity to the edge-intensity-information generator 55.

As will be described later with reference to FIG. 7, the edge-intensity-information generator 55 calculates weight_edge for each pixel of the input image, weight_edge being a weight based on the edge intensity. The edge-intensity-information generator 55 supplies edge-intensity information indicating weight_edge to the edge enhancer 22.

Figure 5:
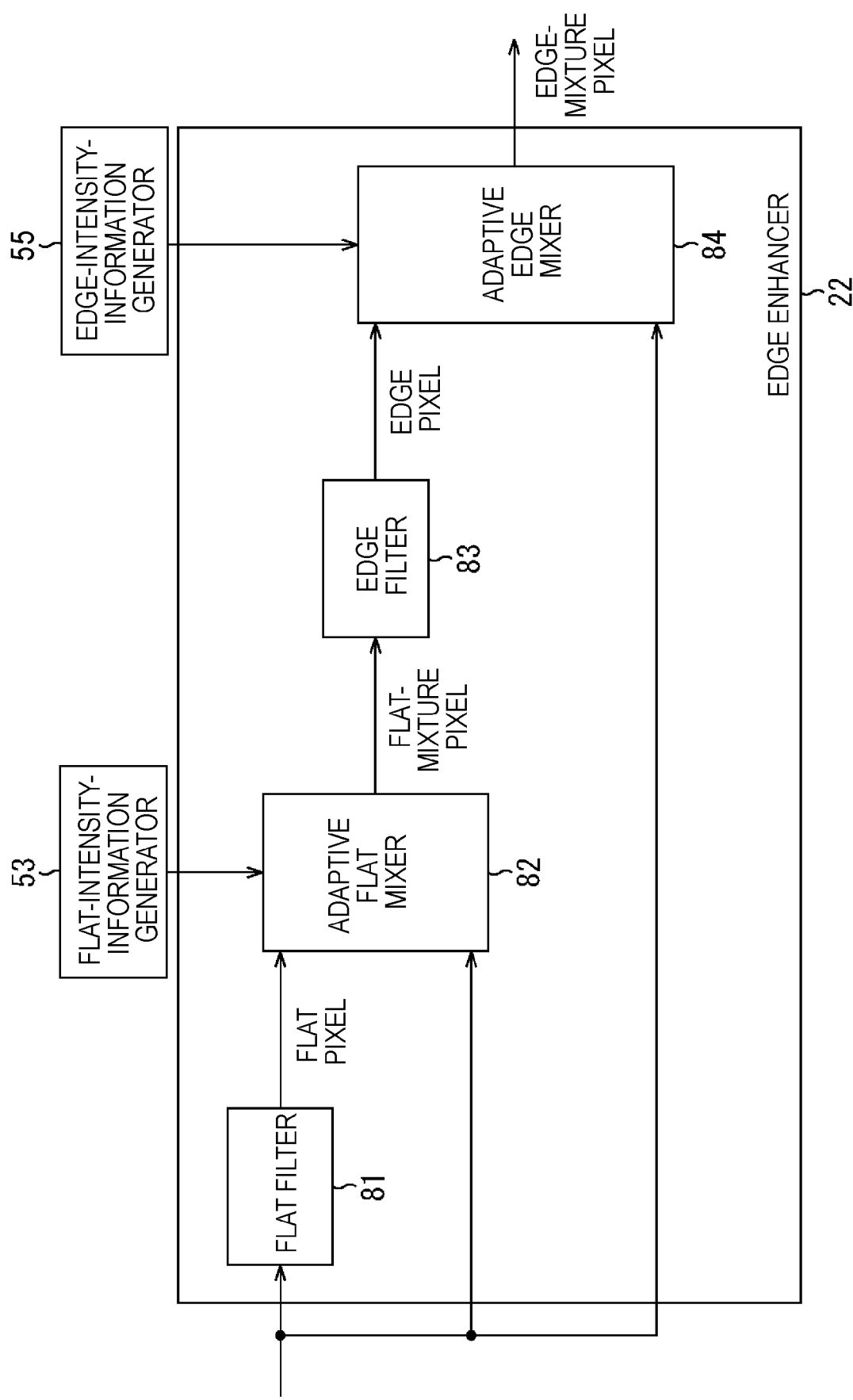
FIG. 5 is a block diagram showing an example functional configuration of an edge enhancer shown in FIG. 3.

FIG. 5 is a block diagram showing an example configuration of the edge enhancer 22. The edge enhancer 22 includes a flat filter 81, an adaptive flat mixer 82, an edge filter 83, and an adaptive edge mixer 84.

As will be described later mainly with reference to FIG. 9, the flat filter 81 performs flat filtering on each pixel of the input image supplied from the image input unit 11. The flat filter 81 supplies an image (hereinafter referred to as a flat image) composed of pixels obtained through the flat filtering (hereinafter referred to as flat pixels) to the adaptive flat mixer 82.

As will be described later mainly with reference to FIG. 9, the adaptive flat mixer 82 adds together the pixel values of pixels at corresponding positions of the input image supplied from the image input unit 11 and the flat image supplied from the flat filter 81, using weight_flat indicated by the flat-intensity information, thereby combining the input image and the flat image. The adaptive flat mixer 82 supplies an image obtained through the combining (hereinafter referred to as a flat-mixture image) to the edge filter 83.

As will be described later mainly with reference to FIG. 9, the edge filter 83 performs edge filtering on each pixel of the flat-mixture image (hereinafter referred to as a flat-mixture pixel). The edge filter 83 supplies an image (hereinafter referred to as an edge image) composed of pixels obtained through the edge filtering (hereinafter referred to as edge pixels) to the adaptive edge mixer 84.

As will be described later mainly with reference to FIG. 9, the adaptive edge mixer 84 adds together the pixel values of pixels at corresponding positions of the input image supplied from the image input unit 11 and the edge image supplied from the edge filter 83, using weight_edge indicated by the edge-intensity information, thereby combining the input image and the edge image. The adaptive edge mixer 84 supplies an image obtained through the combining (hereinafter referred to as an edge-mixture image) to the image output unit 13. Hereinafter, pixels constituting the edge-mixture image will be referred to as edge-mixture pixels.

Next, processes executed by the image processing apparatus 1 will be described with reference to FIGS. 6 to 14.

Figure 6:
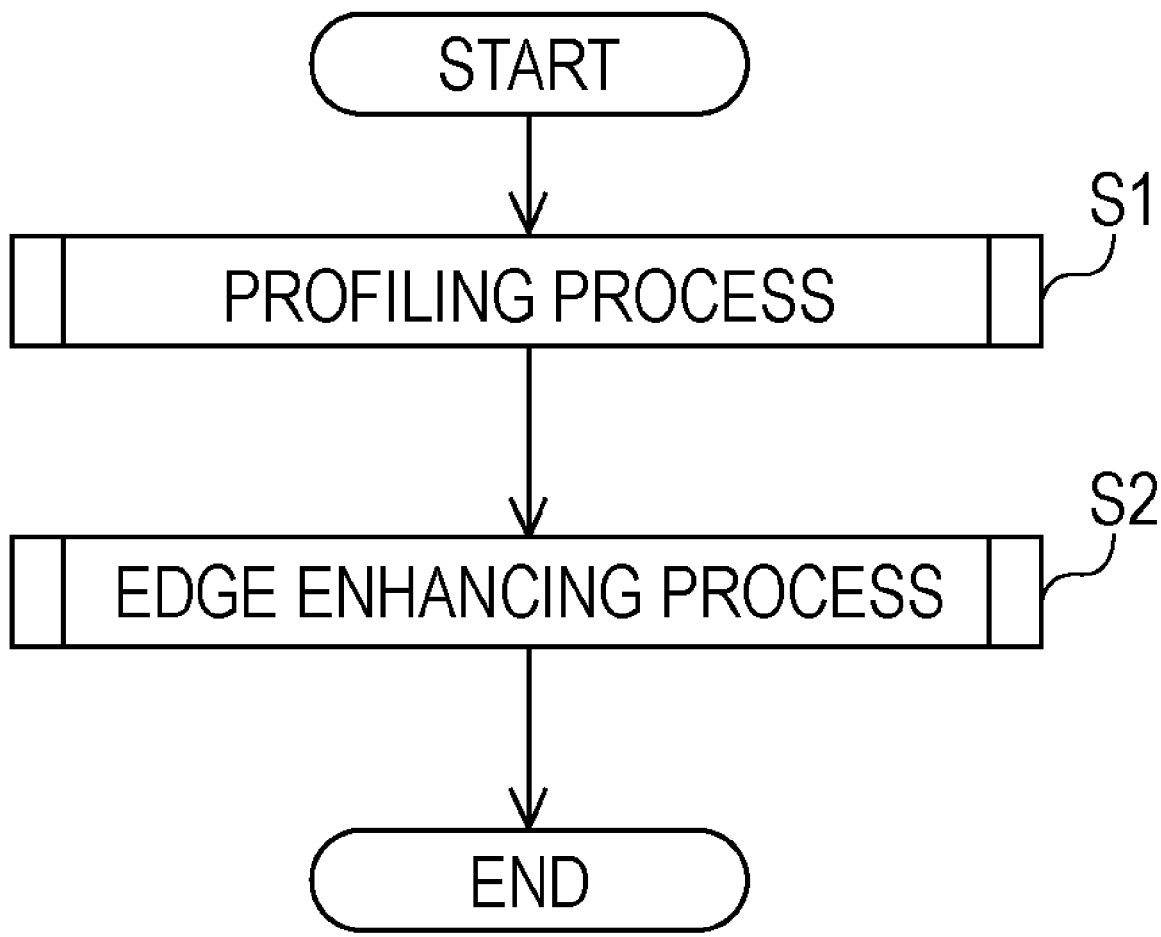
FIG. 6 is a flowchart of image processing executed by the image processing apparatus shown in FIG. 3.

First, a process executed by the image processing apparatus 1 will be described with reference to a flowchart shown in FIG. 6. The edge enhancing process is started, for example, when a user operates an operating unit (not shown) of the image processing apparatus 1 to instruct enhancement of edges in an input image.

In step S1, the profiler 21 executes a profiling process. Now, the profiling process will be described below in detail with reference to a flowchart shown in FIG. 7.

In step S51, the contrast calculator 51 calculates a contrast intensity. More specifically, the contrast calculator 51 selects a target pixel from the pixels of the input image supplied from the image input unit 11, and extracts pixels in a region of a predetermined range (vertically M pixels×horizontally N pixels) centered around the target pixel (hereinafter referred to as a target region).

With the coordinates of the target pixel denoted as (x, y) and the coordinates of a pixel at the top left corner of the target region denoted as $(x_{t0}, y_{t0})$, the contrast calculator 51 calculates Int_Contrast(x, y) indicating the contrast intensity of the target pixel according to expression (1) below:

$$\text{Int\_Contrast}(x, y) = \sum_{i1=0\ldots N-1} \sum_{j1=0\ldots M-1} \sum_{i2=0\ldots N-1} \sum_{j2=0\ldots M-1} \{Coef(i1-i2, j1-j2) \times |P\_in(x_{t0}+i1, y_{t0}+j1) - P\_in(x_{t0}+i2, y_{t0}+j2)|\} \quad (1)$$

$P\_in(x_{t0}+i1, y_{t0}+j1)$ and $P\_in(x_{t0}+i2, y_{t0}+j2)$ denote the pixel values of pixels located at coordinates $(x_{t0}+i1, y_{t0}+j1)$ and $(x_{t0}+i2, y_{t0}+j2)$, respectively. Coef(i1−i2, j1−j2) denotes a weight that is based on a distance between the coordinates $(x_{t0}+i1, y_{t0}+j1)$ and $(x_{t0}+i2, y_{t0}+j2)$. That is, Int_Contrast(x, y) indicating the contrast intensity of the target pixel is a sum of values obtained for individual pairs of adjacent pixels in the target region, the values being obtained by, for each of the pairs of adjacent pixels, multiplying an absolute value of difference between the pixel values of the pixels with a weight associated with a distance between the pixels.

The contrast calculator 51 outputs contrast information indicating Int_Contrast(x, y) to the flat-intensity detector 52 and the edge-intensity detector 54.

In step S52, the flat-intensity detector 52 detects a flat intensity. More specifically, the flat-intensity detector 52 detects Int_Flat(x, y) indicating the flat intensity of the target pixel according to expression (2) below:

$$\text{Int\_Flat}(x, y) = \begin{cases} 1.0 & (\text{Int\_Contrast}(x, y) < T_{f1}) \\ \dfrac{-\text{Int\_Contrast}(x, y) + T_{f2}}{T_{f2} - T_{f1}} & (T_{f1} \leq \text{Int\_Contrast}(x, y) \leq T_{f2}) \\ 0.0 & (\text{Int\_Contrast}(x, y) > T_{f2}) \end{cases} \quad (2)$$

Figure 8:
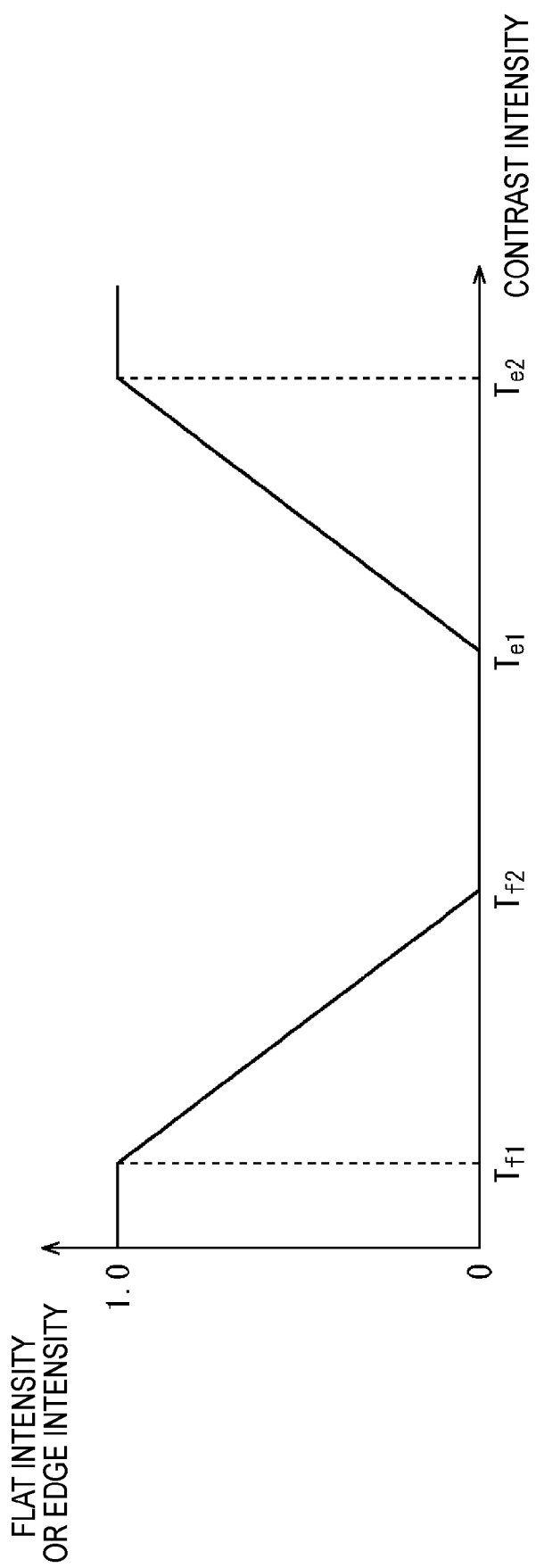
FIG. 8 is a graph showing relationship between contrast intensity and flat intensity and edge intensity.

$T_{f1}$ and $T_{f2}$ are predetermined thresholds. As shown in FIG. 8, Int_Flat(x, y) takes on a maximum value of 1.0 when Int_Contrast(x, y)<$T_{f1}$, decreases toward 0.0 as Int_Contrast(x, y) increases when $T_{f1} \leq$ Int_Contrast(x, y)$\leq T_{f2}$, and takes on a minimum value of 0.0 when Int_Contrast(x, y)>$T_{f2}$.

The contrast intensities in the range from 0 to the threshold $T_{f1}$ are contrast intensities that occur with high frequencies of occurrence in flat regions, where change in pixel value is small.

The flat-intensity detector 52 supplies information indicating Int_Flat(x, y) to the flat-intensity-information generator 53.

In step S53, the edge-intensity detector 54 detects an edge intensity. More specifically, the edge-intensity detector 54 detects Int_Edge(x, y) indicating the edge intensity of the target pixel according to expression (3) below:

$$\text{Int\_Edge}(x, y) = \begin{cases} 0.0 & (\text{Int\_Contrast}(x, y) < T_{e1}) \\ \dfrac{\text{Int\_Contrast}(x, y) + T_{e1}}{T_{e2} - T_{e1}} & (T_{e1} \leq \text{Int\_Contrast}(x, y) \leq T_{e2}) \\ 1.0 & (\text{Int\_Contrast}(x, y) > T_{e2}) \end{cases} \quad (3)$$

$T_{e1}$ and $T_{e2}$ are predetermined thresholds. As shown in FIG. 8, Int_Edge(x, y) takes on a minimum value of 0.0 when Int_Contrast(x, y)<$T_{e1}$, increase toward 1.0 as Int_Contrast (x, y) increases when $T_{e1} \leq$ Int_Contrast(x, y)$\leq T_{e2}$, and takes on a maximum value of 1.0 when Int_Contrast(x, y)>$T_{e2}$.

The contrast intensities in the range above the threshold $T_{e2}$ are contrast intensities that occur with high frequencies of occurrence in edge regions, where pixel value changes sharply.

The edge-intensity detector 54 supplies information indicating Int_Edge(x, y) to the edge-intensity-information generator 55.

In step S54, the profiler 21 checks whether the processing has been finished for all the pixels. When contrast intensities, flat intensities, and edge intensities have not yet been detected for all the pixels of the input image, it is determined that the processing has not yet been finished for all the pixels, and the process returns to step S51. Then, steps S51 to S54 are repeated until it is determined in step S54 that the processing has been finished for all the pixels, whereby contrast intensities, flat intensities, and edge intensities are detected for all the pixels of the input image.

When it is determined in step S54 that the processing has been finished for all the pixels, the process proceeds to step S55.

In step S55, the flat-intensity-information generator 53 generates flat-intensity information. More specifically, the flat-intensity-information generator 53 calculates weight_flat (x, y) for each pixel of the input image according to expression (4) below:

$$\text{weight\_flat}(x, y) = \sum_{i=0}^{N-1} \sum_{j=0}^{M-1} \{\text{Coef\_Flat}(x_{t0} + i, y_{t0} + j) \times \text{Int\_Flat}(x_{t0} + i, y_{t0} + j)\} \quad (4)$$

Coef_Flat($x_{t0}$+i, $y_{t0}$+j) denotes a weight associated with a distance between the target pixel and a pixel with coordinates ($x_{t0}$+i, $y_{t0}$+j). Coef_flat($x_{t0}$+i, $y_{t0}$+j) increases as the distance decreases, and decreases as the distance increases. That is, weight_flat(x, y) is a sum of values obtained for the individual pixels in the target region, the values being obtained by, for each of the pixels, multiplying the flat intensity with the weight Coef_Flat associated with a distance between the pixel and the target pixel.

Thus, weight_flat(x, y) increases as the flat intensities of the pixels in the target region increase, and decreases as the flat intensities of the pixels in the target region decrease. Furthermore, weight_flat(x, y) increases as pixels with high flat intensities are located closer to the target pixel.

The flat-intensity-information generator 53 supplies flat-intensity information indicating weight_flat(x, y) to the adaptive flat mixer 82.

In step S56, the edge-intensity-information generator 55 generates edge-intensity information. Then, the profiling process is finished. More specifically, the edge-intensity-information generator 55 calculates weight_edge(x, y) for each pixel of the input image according to expression (5) below:

$$\text{weight\_edge}(x, y) = \sum_{i=0}^{N-1} \sum_{j=0}^{M-1} \{\text{Coef\_Edge}(x_{t0} + i, y_{t0} + j) \times \text{Int\_Edge}(x_{t0} + i, y_{t0} + j)\} \quad (5)$$

Coef_Edge($x_{t0}$+i, $y_{t0}$+j) denotes a weight associated with a distance between the target pixel and a pixel with coordinates ($x_{t0}$+i, $y_{t0}$+j). Coef_edge($x_{t0}$+i, $y_{t0}$+j) increases as the distance decreases, and decreases as the distance increases. That is, weight_edge(x, y) is a sum of values obtained for the individual pixels in the target region, the values being obtained by, for each of the pixels, multiplying the edge intensity with the weight Coef_Edge associated with a distance between the pixel and the target pixel.

Thus, weight_edge(x, y) increases as the edge intensities of the pixels in the target region increase, and decreases as the edge intensities of the pixels in the target region decrease. Furthermore, weight_edge(x, y) increases as pixels with high edge intensities are located closer to the target pixel.

The edge-intensity-information generator 55 supplies edge-intensity information indicating weight_edge(x, y) to the adaptive edge mixer 84.

Referring back to FIG. 6, the edge enhancer 22 executes the edge enhancing process. The process executed by the image processing apparatus 1 is then finished. Now, the edge enhancing process will be described below in detail with reference to a flowchart shown in FIG. 9.

In step S101, the flat filter 81 performs flat filtering on the input image. More specifically, for each pixel of the input image, the flat filter 81 performs flat filtering on a region including the pixel and neighboring pixels, using a filter that attenuates components in a predetermined spatial frequency band of the input image. The flat filter 81 supplies a flat image composed of flat pixels obtained through the flat filtering to the adaptive flat mixer 82.

Figure 10:
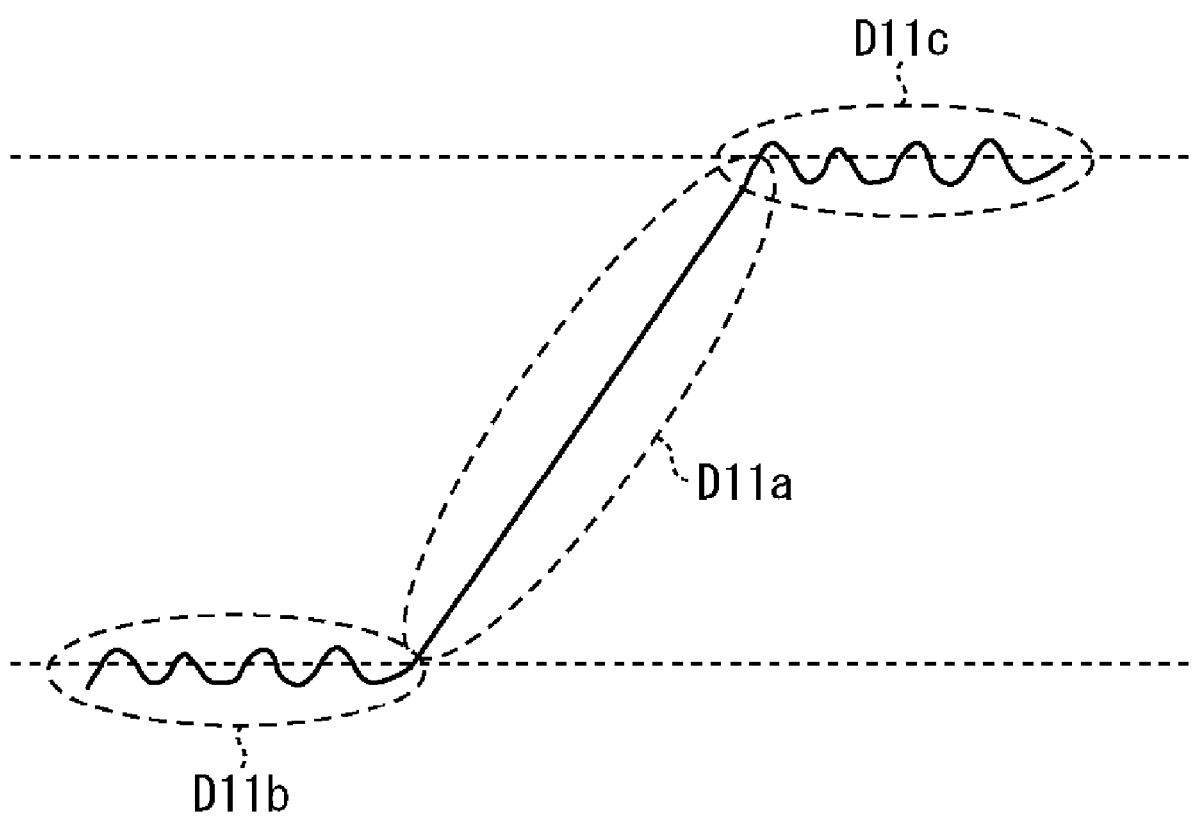
FIG. 10 is a graph showing an example of change in pixel value in an input image.
Figure 11:
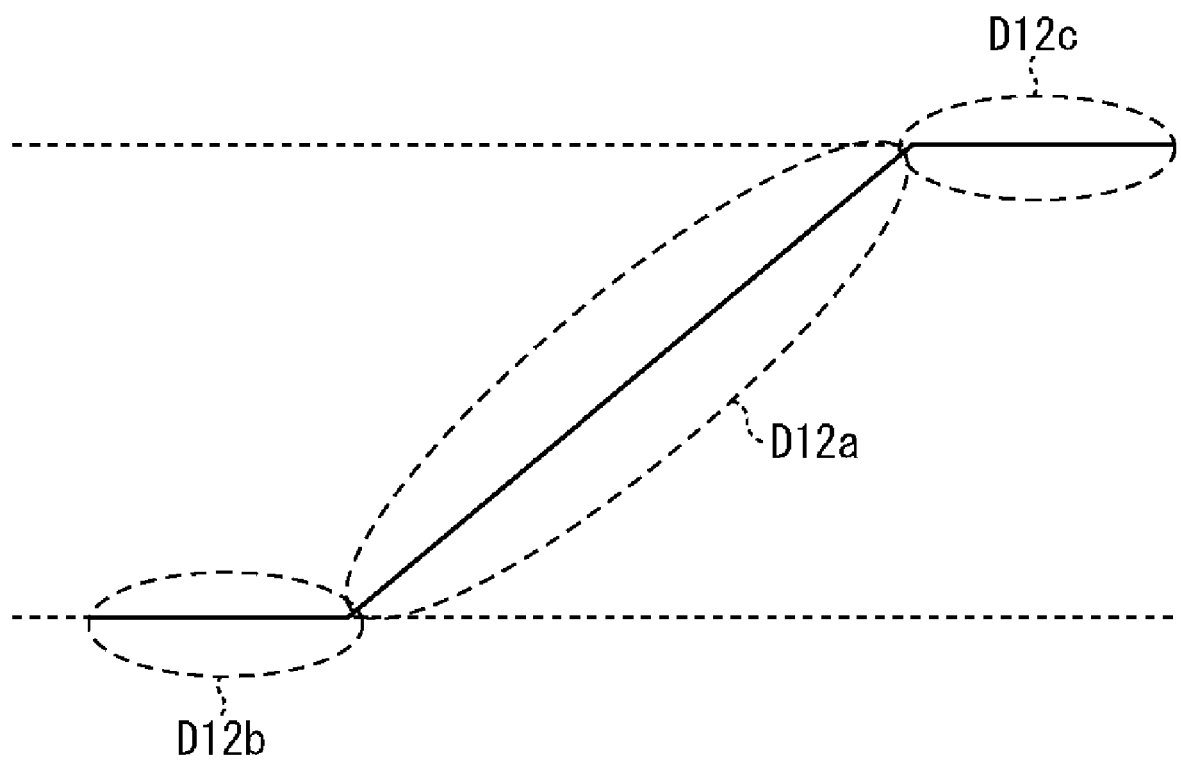
FIG. 11 is a graph showing an example of change in pixel value in a flat image.

For example, the flat filter 81 performs flat filtering using a smoothing filter that attenuates high-frequency components of an image, such as a median filter or a low-pass filter. In this case, when a region where the pixel value changes as shown in FIG. 10 exists in the input image, the pixel value changes as shown in FIG. 11 in a corresponding region of a flat image obtained through the flat filtering. That is, by smoothing the change in pixel value, in a region D12a shown in FIG. 11 corresponding to a region D11a shown in FIG. 10, where an edge in the input image exists, the change is pixel value more moderate (i.e., the edge intensity is decreased). Furthermore, in regions D12b and D12c shown in FIG. 11 corresponding to regions D11b and D11c shown in FIG. 10, located in the vicinity of the edge ii the input image, small fluctuation (change in amplitude) in the pixel value in the vicinity of the edge is suppressed.

In step S102, the adaptive flat mixer 82 performs adaptive flat mixing on the input image and the flat image. More specifically, the adaptive flat mixer 82 calculates the pixel values of flat-mixture pixels constituting a flat-mixture image according to expression (6) below:

$$P\_flat\_mix(x, y) = \quad (6)$$
$$(1 - weight\_flat(x, y)) \times P\_in(x, y) + weight\_flat(x, y) \times P\_flat(x, y)$$

P_flat(x, y) denotes the pixel value of a pixel of a flat image (flat pixel) with coordinates (x, y). P_flat_mix(x, y) denotes the pixel value of a pixel of a flat-mixture image (flat-mixture pixel) with coordinates (x, y). That is, the adaptive flat mixer 82 adds together the pixel values of pixels at corresponding positions of the input image and the flat image with the ratio of the pixel value of the flat image increased and the ratio of the pixel value of the input image decreased as weight_flat(x, y) increases (as the flat intensities in the target region increase), and with the ratio of the pixel value of the input image increased and the ratio of the pixel value of the flat image decreased as weight_flat(x, y) decreases (as the flat intensities in the target region decrease).

Figure 12:
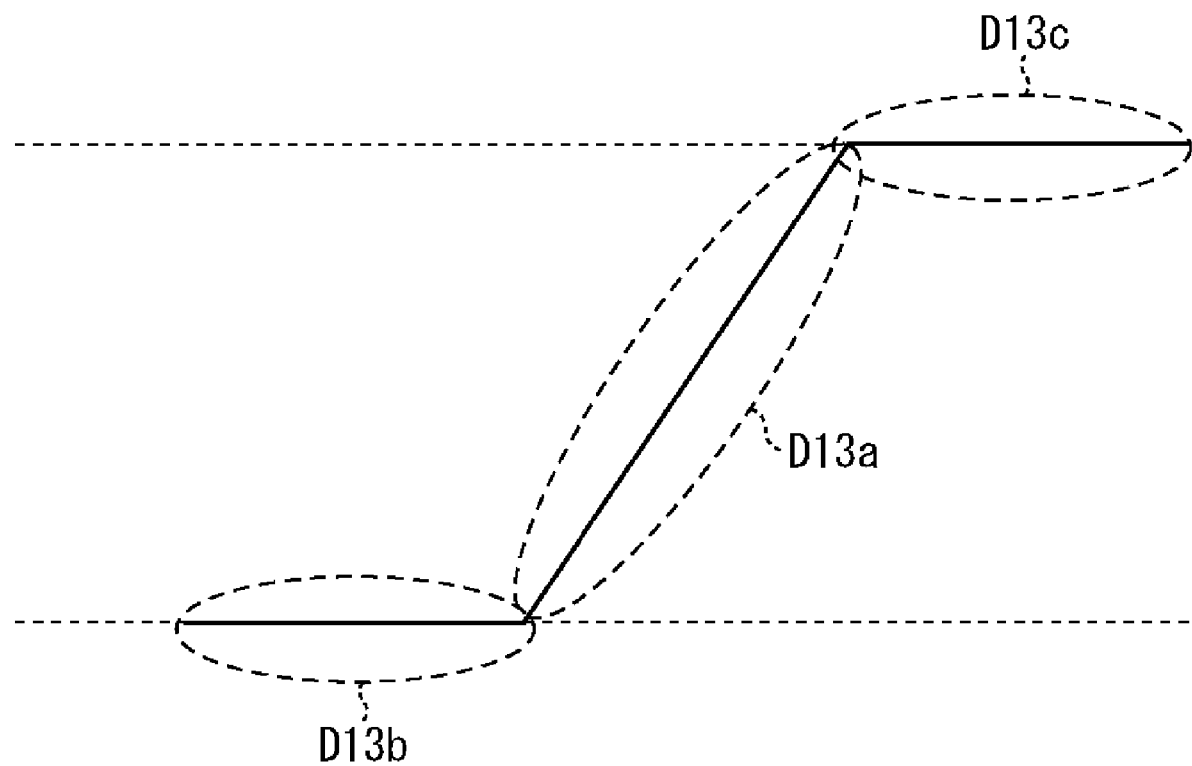
FIG. 12 is a graph showing an example of change in pixel value in a flat-mixture image.

Thus, for example, when an input image in which the pixel value changes as shown in FIG. 10 and a flat image in which the pixel value changes as shown in FIG. 11 are input to the adaptive flat mixer 82, the pixel value changes as shown in FIG. 12 in the flat-mixture image output from the adaptive flat mixer 82. More specifically, in a region D13a shown in FIG. 12 corresponding to the region D11a shown in FIG. 10, the pixel value changes with the substantially same gradient as in the region D11a shown in FIG. 10. That is, in the flat-mixture image, the edge in the input image is maintained substantially without change. Furthermore, in regions D13b and D13c shown in FIG. 12 corresponding to the regions D11b and D11c shown in FIG. 10, the pixel value changes substantially in the same manner as in the regions D12b and D12c shown in FIG. 11. That is, in the flat-mixture image, small fluctuation in the pixel value in the vicinity of the edge in the input image is suppressed.

The adaptive flat mixer 82 supplies a flat-mixture image composed of flat-mixture pixels obtained through the adaptive flat mixing to the edge filter 83.

In step S103, the edge filter 83 performs edge filtering on the flat-mixture image. More specifically, for each pixel of the flat-mixture image, the edge filter 83 performs filtering on a region including the pixel and neighboring pixels, using a filter that passes high-frequency components of an image. The edge filter 83 supplies an edge image composed of edge pixels obtained through the edge filtering to the adaptive edge mixer 84.

Figure 13:
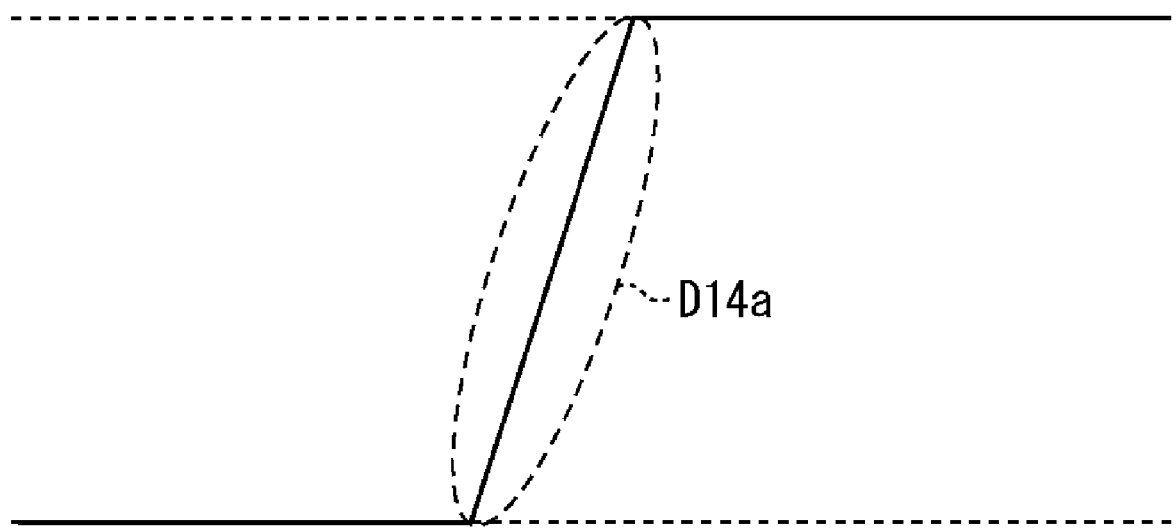
FIG. 13 is a graph showing an example of change in pixel value in an edge image.

For example, when a flat-mixture image in which the pixel value changes as shown in FIG. 12 is input to the edge filter 83, the pixel value changes as shown in FIG. 13 in the edge image output from the edge filter 83. More specifically, in a region D14a shown in FIG. 13 corresponding to the region D13a shown in FIG. 12 (the region D11a shown in FIG. 10), the pixel value changes with a larger gradient than in the region D13a (the region D11a). That is, in the edge image, the edge in the input image is enhanced.

In step S104, the adaptive edge mixer 84 performs adaptive edge mixing on the input image and the edge image. More specifically, the adaptive edge mixer 84 calculates the pixel values of edge-mixture pixels constituting an edge-mixture image according to expression (7) below:

$$P\_edge\_mix(x, y) = (1 - weight\_edge(x, y)) \times P\_in(x, y) + \quad (7)$$
$$weight\_edge(x, y) \times P\_edge(x, y)$$

P_edge(x, y) denotes the pixel value of a pixel of an edge image (edge pixel) with coordinates (x, y). P_edge_mix(x, y) denotes the pixel value of a pixel of an edge-mixture image (edge-mixture pixel) with coordinates (x, y). That is, the adaptive edge mixer 84 adds together the pixel values of pixels at corresponding positions of the input image and the edge image with the ratio of the pixel value of the edge image increased and the ratio of the pixel value of the input image decreased as weight_edge(x, y) increases (as the edge intensities in the target region increase), and with the ratio of the pixel value of the input image increased and the ratio of the pixel value of the edge image decreased as weight_edge(x, y) decreases (as the edge intensities in the target region decrease).

Figure 14:
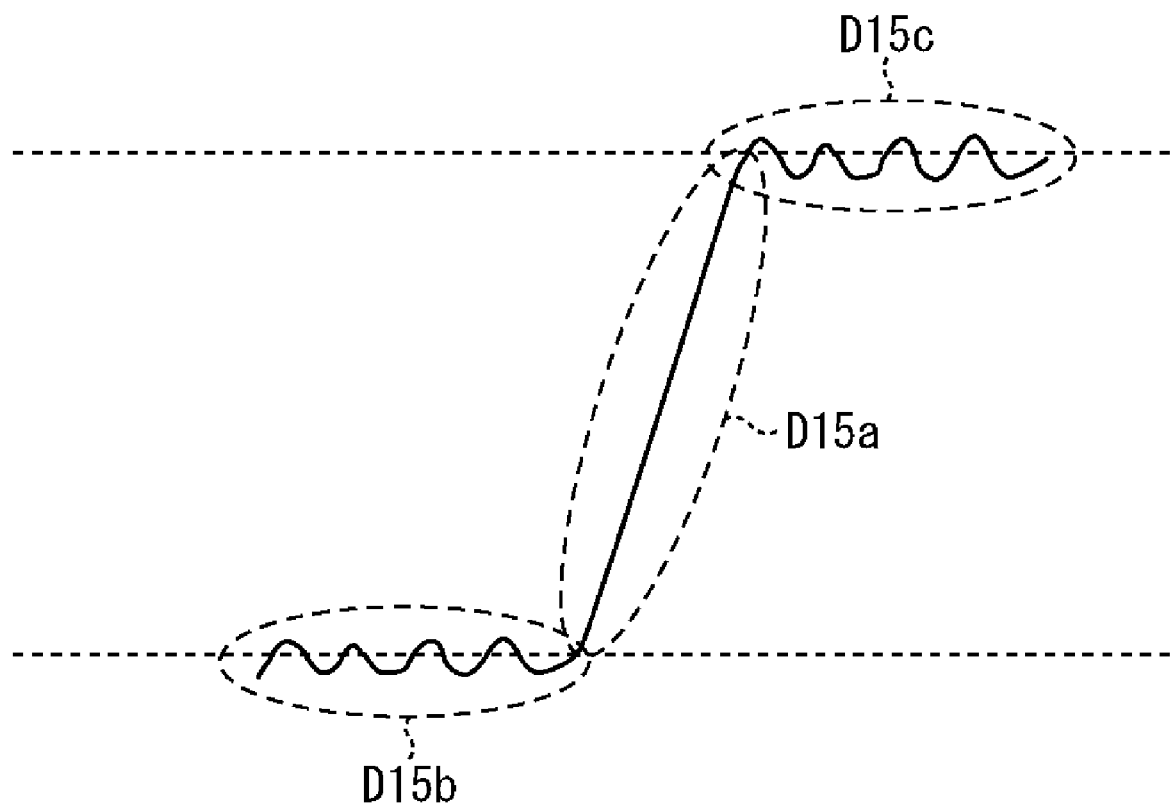
FIG. 14 is a graph showing an example of change in pixel value in an edge-mixture image.

Thus, for example, when an input image in which the pixel value changes as shown in FIG. 10 and an edge image in which the pixel value changes as shown in FIG. 13 are input to the adaptive edge mixer 84, the pixel value changes as shown in FIG. 14 in the edge-mixture image output from the adaptive edge mixer 84. More specifically, in a region D15a shown in FIG. 14 corresponding to the region D11a shown in FIG. 10, the pixel value changes with the substantially same gradient as in the region D14a shown in FIG. 13. That is, in the edge-mixture image, the edge in the input image is enhanced. Furthermore, in regions D15b and D15c shown in FIG. 14 corresponding to the regions D11b and D11c shown in FIG. 10, the pixel value changes substantially in the same manner as in the regions D11b and D11c shown in FIG. 10. That is, in the edge-mixture image, small fluctuation in the pixel value in the vicinity of the edge in the input image is maintained substantially without change.

Thus, in the edge-mixture image, only edges of the input image are enhanced to improve edge sharpness, and the other regions represent substantially the same image as the input image. This serves to alleviate degradation in image quality due to noise enhancement or contrast reduction.

The adaptive edge mixer 84 supplies an edge-mixture image composed of edge-mixture pixels obtained through the adaptive edge mixing to the image output unit 13.

Figure 15:
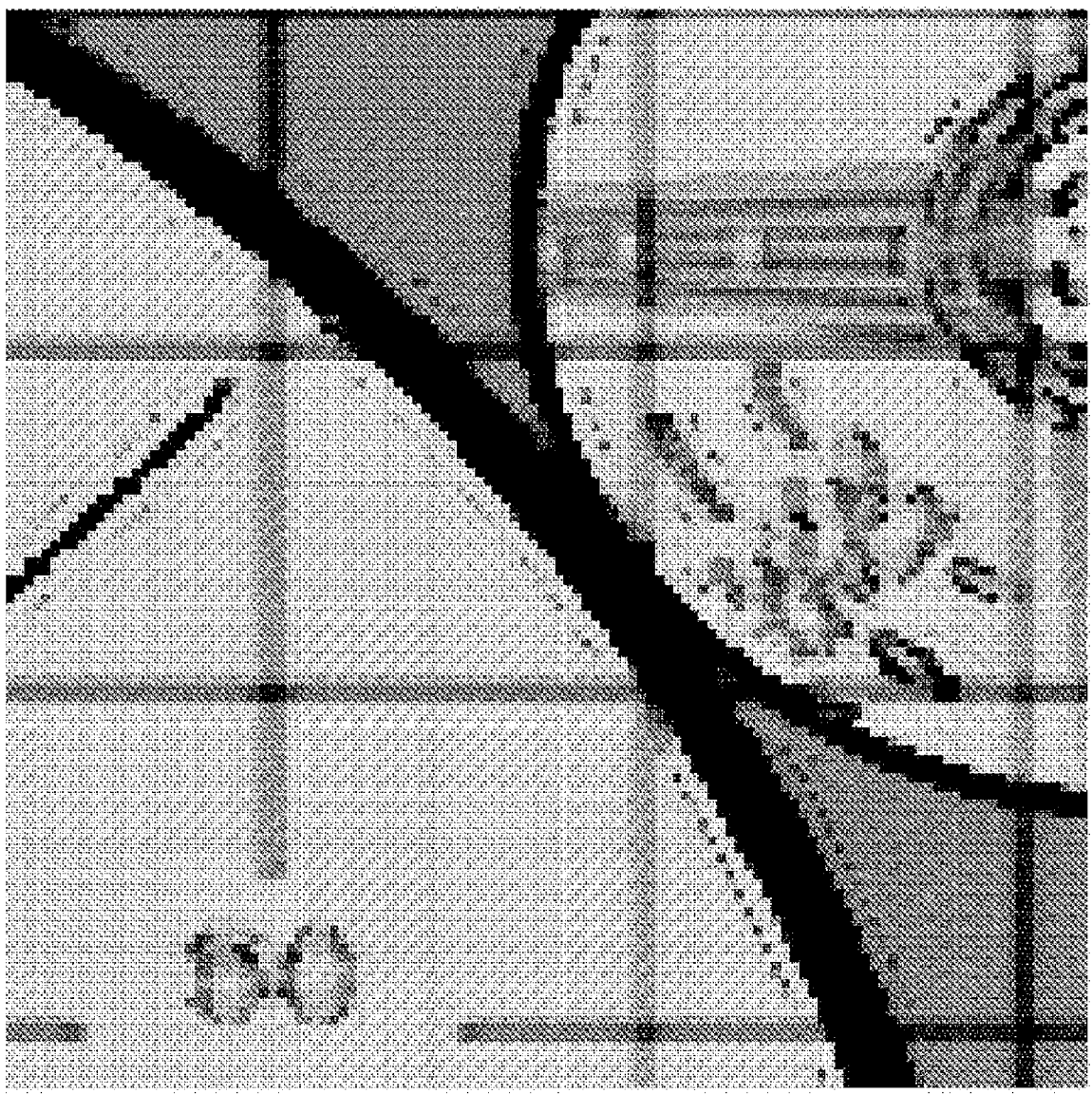
FIG. 15 is a diagram showing an example of an image in which edges have been corrected using existing techniques.
Figure 16:
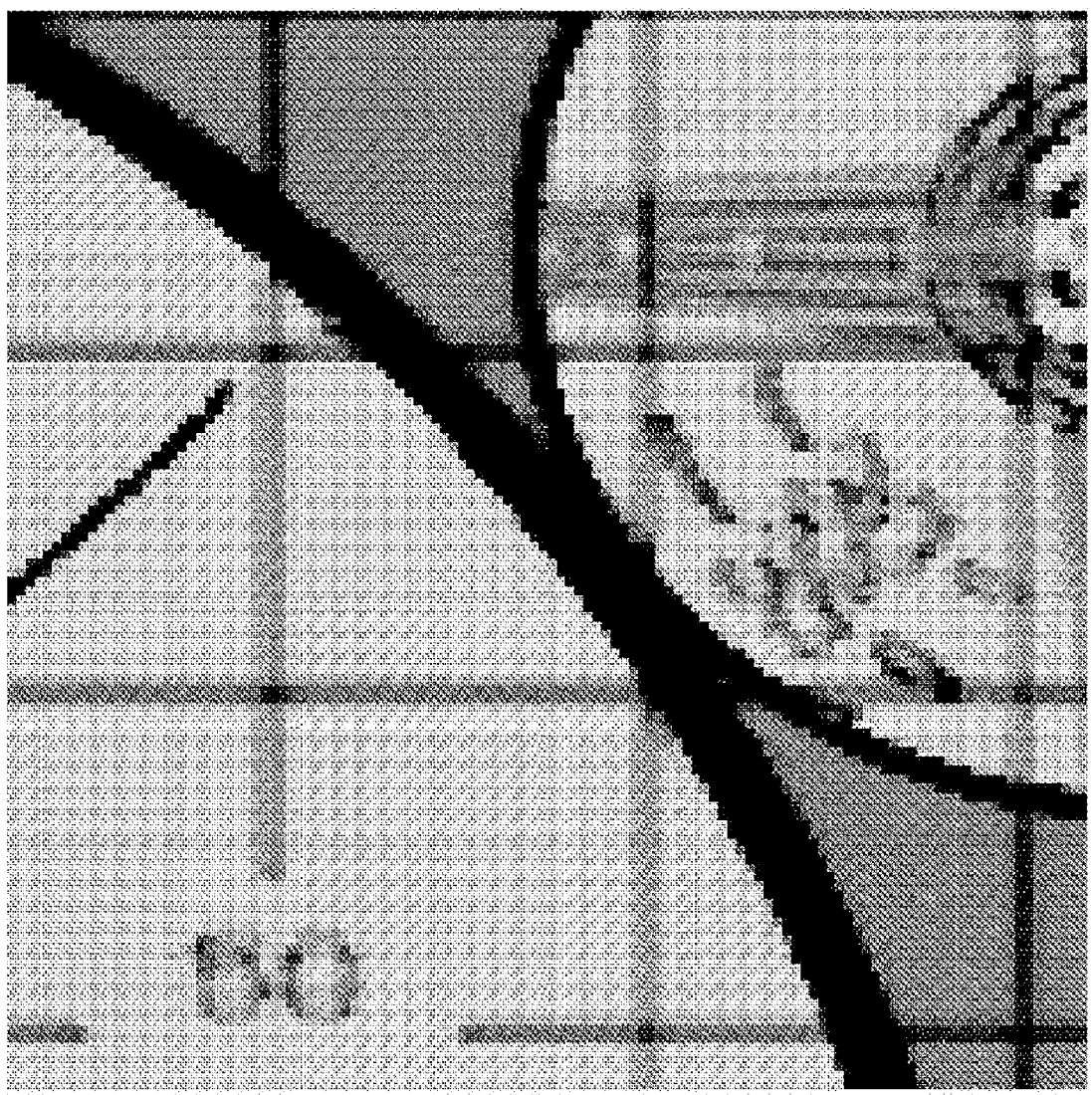
FIG. 16 is a diagram showing an example of an image in which edges have been corrected by the image processing apparatus shown in FIG. 3.

FIG. 15 shows an image obtained by correcting edges in an image using existing techniques. FIG. 16 shows an image obtained by correcting edges in the same image using techniques according to this embodiment. In the image shown in FIG. 15, noise is enhanced in the vicinities of edges, so that image quality is degraded. On the other hand, in the image shown in FIG. 16, noise is not so apparent in the vicinities of edges, so that image quality is favorable.

Furthermore, since contrast intensities, flat intensities, edge intensities, weight_flat, and weight_edge can be obtained by simple calculations, the amount of computation executed for edge enhancement can be reduced. Thus, it is possible to readily and quickly enhance sharpness of edges in an image while alleviating noise enhancement.

As described above, a contrast intensity is detected for each pixel in a first image, the contrast intensity indicating an intensity of contrast in a region including and neighboring the pixel; a flat intensity is detected for each pixel in the first image on the basis of the contrast intensity, the flat intensity indicating a degree of smallness of change in pixel value relative to change in position in the region including and neighboring the pixel; an edge intensity is detected for each pixel in the first image on the basis of the contrast intensity, the edge intensity indicating a degree of largeness of change in pixel value relative to change in position in the region including and neighboring the target pixel; a flat weight for each pixel in the first image is set, the flat weight being a weight that increases as flat intensities of pixels in the region including and neighboring the pixel increase and that decreases as the flat intensities decrease; an edge weight for the each pixel in the first image is set, the edge weight being a weight that increases as edge intensities of the pixels in the region including and neighboring the pixel increase and that decreases as the edge intensities decrease; components in a predetermined frequency band of the first image are attenuated to form a second image; the first image and the second image are combined to form a third image by adding together pixel values of pixels at corresponding positions of the first image and the second image, using weights that are based on the flat weight; edges in the third image are enhanced to form a fourth image; and the first image and the fourth image are combined by adding together pixel values of pixels at corresponding positions of the first image and the fourth image, using weights that are based on the edge weight. Accordingly, it is possible to enhance sharpness of edges in an image. Furthermore, it is possible to readily enhance edge sharpness while alleviating noise enhancement.

Although the components of the edge enhancer 22 sequentially processes one image in the embodiment described above, alternatively, the components may execute processing in parallel on a pixel-by-pixel basis.

Furthermore, although the contrast intensity, weight_flat, and weight_edge are calculated using pixels in the same target region in the embodiment described above, regions of pixels used for calculating these values may be defined individually.

The present invention can be applied to various types of image processing apparatuses that enhance or correct edges, such as personal computers, personal digital assistants (PDAs), or various audio-visual (AV) devices.

The series of processes described above can be executed by hardware or software. When the series of processes are executed by software, programs constituting the software are installed from a program recording medium onto a computer embedded in special hardware or onto a general-purpose personal computer or the like that is capable of executing various functions with various programs installed thereon.

Figure 17:
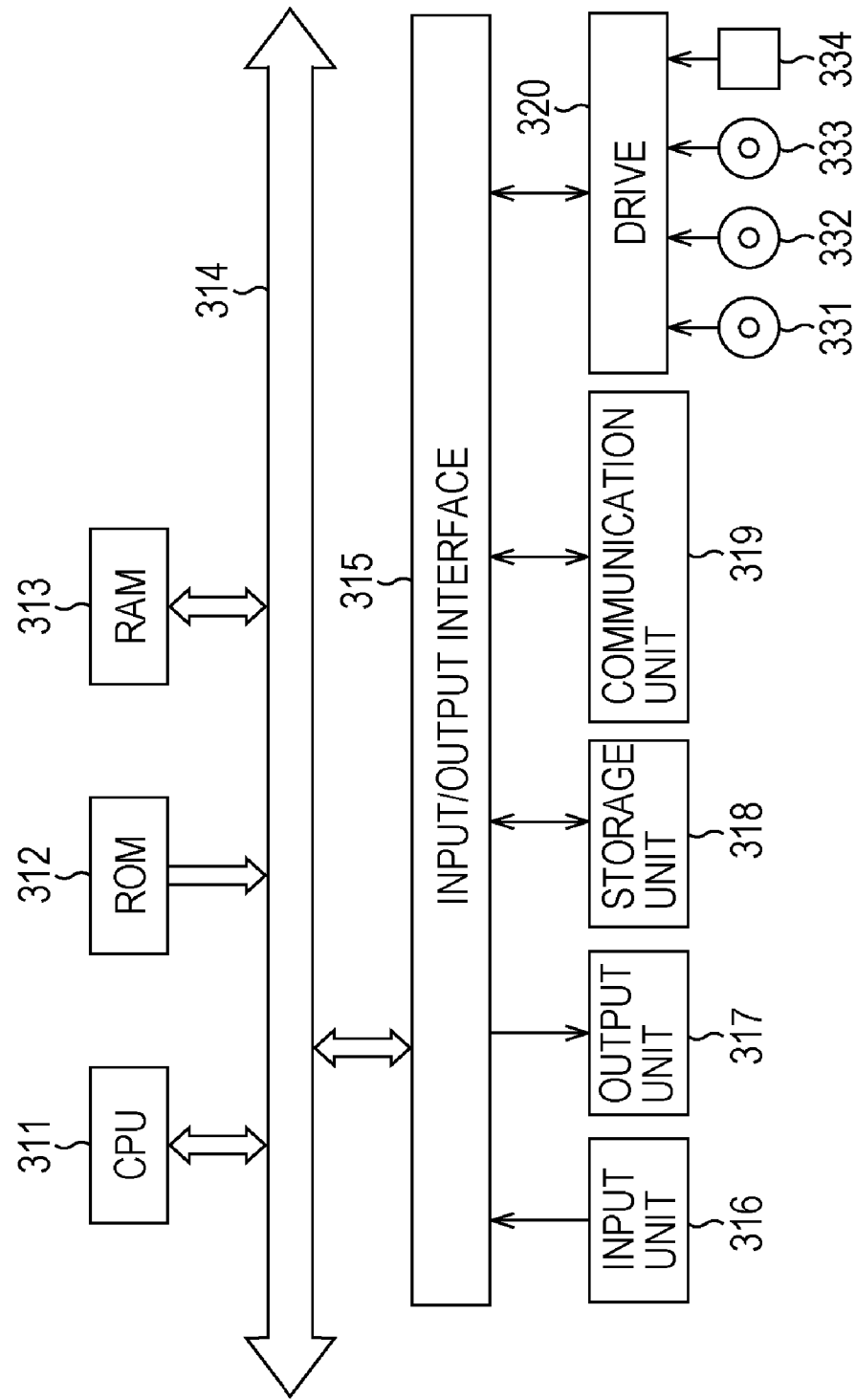
FIG. 17 is a block diagram showing an example configuration of a personal computer.

FIG. 17 is a block diagram showing an example configuration of a personal computer that executes the series of processes described above according to programs. A central processing unit (CPU) 301 executes various processes according to programs stored in a read-only memory (ROM) 302 or a storage unit 308. A random access memory (RAM) 303 stores programs executed by the CPU 301, relevant data, etc. as needed. The CPU 301, the ROM 302, and the RAM 303 are connected to each other via a bus 304.

The CPU 301 is also connected to an input/output interface 305 via the bus 304. The input/output interface 305 is connected to an input unit 306 including a keyboard, a mouse, a microphone, etc., and to an output unit 307 including a display, a speaker, etc. The CPU 301 executes various processes according to instructions input from the input unit 306. The CPU 301 then outputs results of the processes to the output unit 307.

The input/output interface 305 is also connected to the storage unit 308, such as a hard disc. The storage unit 308 stores programs executed by the CPU 301 and various types of data. A communication unit 309 carries out communications with external devices via networks, such as the Internet or local area networks.

Also, it is possible to obtain programs via the communication unit 309 and to store the programs in the storage unit 308.

Furthermore, a drive 310 is connected to the input/output interface 305. When a removable medium 311, such as a magnetic disc, an optical disc, a magneto-optical disc, or a semiconductor memory, is mounted on the drive 310, the drive 310 drives the removable medium 311 to obtain programs, data, etc. recorded thereon. The programs, data, etc. that have been obtained are transferred to and stored in the storage unit 308 as needed.

As shown in FIG. 17, the program recording medium for storing programs that are installed onto a computer for execution by the computer may be, for example, the removable medium 311, which is a package medium such as a magnetic disc (e.g., a flexible disc), an optical disc (e.g., a CD-ROM (compact disc read-only memory) or a DVD (digital versatile disc)), a magneto-optical disc, or a semiconductor memory, or the ROM 302 or the hard disc of the storage unit 308 temporarily or permanently storing the programs. The programs can be stored on the program recording medium as needed via the communication unit 309, which is an interface such as a router or a modem, using a wired or wireless communication medium, such as a local area network, the Internet, or digital satellite broadcasting.

It is to be understood that steps defining the programs stored on the program recording medium may include processes that are executed in parallel or individually, as well as processes that are executed in the orders described in this specification.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:

contrast detecting means for detecting a contrast intensity of a target pixel being considered in a first image, the contrast intensity indicating an intensity of contrast in a region including and neighboring the target pixel;

flat-intensity detecting means for detecting a flat intensity of the target pixel on the basis of the contrast intensity, the flat intensity indicating a degree of smallness of change in pixel value relative to change in position in the region including and neighboring the target pixel;

edge-intensity detecting means for detecting an edge intensity of the target pixel on the basis of the contrast intensity, the edge intensity indicating a degree of largeness of change in pixel value relative to change in position in the region including and neighboring the target pixel;

flat-weight setting means for setting a flat weight for the target pixel, the flat weight being a weight that increases as flat intensities of pixels in the region including and neighboring the target pixel increase and that decreases as the flat intensities decrease;

edge-weight setting means for setting an edge weight for the target pixel, the edge weight being a weight that increases as edge intensities of the pixels in the region including and neighboring the target pixel increase and that decreases as the edge intensities decrease;

attenuating means for attenuating components in a predetermined frequency band of the first image to form a second image;

first combining means for combining the first image and the second image to form a third image by adding together pixel values of pixels at corresponding positions of the first image and the second image, using weights that are based on the flat weight;

edge enhancing means for enhancing edges in the third image to form a fourth image; and second combining means for combining the first image and the fourth image by adding together pixel values of pixels at corresponding positions of the first image and the fourth image, using weights that are based on the edge weight.

2. The image processing apparatus according to claim 1, wherein, as the contrast intensity, the contrast detector detects a sum of values obtained for individual pairs of adjacent pixels in the region including and neighboring the target pixel, the values being obtained by, for each of the pairs of adjacent pixels, multiplying an absolute value of difference between pixel values of the pixels with a weight associated with a distance between the pixels.

3. The image processing apparatus according to claim 1, wherein the flat intensity takes on a maximum value when the contrast intensity is less than a first threshold, decreases as the contrast intensity increases when the contrast intensity is greater than or equal to the first threshold and less than or equal to a second threshold, and takes on a minimum value when the contrast intensity is greater than the second threshold, and the edge intensity takes on a minimum value when the contrast intensity is less than a third threshold, increases as the contrast intensity increases when the contrast intensity is greater than or equal to the third threshold and less than or equal to a fourth threshold, and takes on a maximum value when the contrast intensity is greater than the fourth threshold.

4. The image processing apparatus according to claim 1, wherein, as the flat weight, the flat-weight setting means sets a sum of values obtained for the individual pixels in the region including and neighboring the target pixel, the values being obtained by, for each of the pixels, multiplying the flat intensity with a weight associated with a distance between the pixel and the target pixel, and wherein, as the edge weight, the edge-weight setting means sets a sum of values obtained for the individual pixels in the region including and neighboring the target pixel, the values being obtained by, for each of the pixels, multiplying the edge intensity with a weight associated with a distance between the pixel and the target pixel.

5. The image processing apparatus according to claim 1, wherein the attenuating means attenuates components in a high-frequency band of the first image.

6. The image processing apparatus according to claim 1, wherein the first combining means adds together the pixel values of the pixels at the corresponding positions of the first image and the second image with a ratio of the pixel value of the second image increased as the flat weight increases and with a ratio of the pixel value of the first image increased as the flat weight decreases, and wherein the second combining means adds together the pixel values of the pixels at the corresponding positions of the first image and the fourth image with a ratio of the pixel value of the fourth image increased as the edge weight increases and with a ratio of the pixel value of the first image increased as the edge weight decreases.

7. An image processing method comprising the steps of:

detecting a contrast intensity of a target pixel being considered in a first image, the contrast intensity indicating an intensity of contrast in a region including and neighboring the target pixel;

detecting a flat intensity of the target pixel on the basis of the contrast intensity, the flat intensity indicating a degree of smallness of change in pixel value relative to change in position in the region including and neighboring the target pixel;

detecting an edge intensity of the target pixel on the basis of the contrast intensity, the edge intensity indicating a degree of largeness of change in pixel value relative to change in position in the region including and neighboring the target pixel;

setting a flat weight for the target pixel, the flat weight being a weight that increases as flat intensities of pixels in the region including and neighboring the target pixel increase and that decreases as the flat intensities decrease;

setting an edge weight for the target pixel, the edge weight being a weight that increases as edge intensities of the pixels in the region including and neighboring the target pixel increase and that decreases as the edge intensities decrease;

attenuating components in a predetermined frequency band of the first image to form a second image;

combining the first image and the second image to form a third image by adding together pixel values of pixels at corresponding positions of the first image and the second image, using weights that are based on the flat weight;

enhancing edges in the third image to form a fourth image; and combining the first image and the fourth image by adding together pixel values of pixels at corresponding positions of the first image and the fourth image, using weights that are based on the edge weight.

8. A program embodied on a non-transitory computer readable medium for causing a computer to execute processing comprising the steps of:

detecting a contrast intensity of a target pixel being considered in a first image, the contrast intensity indicating an intensity of contrast in a region including and neighboring the target pixel;

detecting a flat intensity of the target pixel on the basis of the contrast intensity, the flat intensity indicating a degree of smallness of change in pixel value relative to change in position in the region including and neighboring the target pixel;

detecting an edge intensity of the target pixel on the basis of the contrast intensity, the edge intensity indicating a degree of largeness of change in pixel value relative to change in position in the region including and neighboring the target pixel;

setting a flat weight for the target pixel, the flat weight being a weight that increases as flat intensities of pixels in the region including and neighboring the target pixel increase and that decreases as the flat intensities decrease;

setting an edge weight for the target pixel, the edge weight being a weight that increases as edge intensities of the pixels in the region including and neighboring the target pixel increase and that decreases as the edge intensities decrease;

attenuating components in a predetermined frequency band of the first image to form a second image;

combining the first image and the second image to form a third image by adding together pixel values of pixels at corresponding positions of the first image and the second image, using weights that are based on the flat weight;

enhancing edges in the third image to form a fourth image; and combining the first image and the fourth image by adding together pixel values of pixels at corresponding positions of the first image and the fourth image, using weights that are based on the edge weight.

9. An image processing apparatus comprising:

a contrast detector configured to detect a contrast intensity of a target pixel being considered in a first image, the contrast intensity indicating an intensity of contrast in a region including and neighboring the target pixel;

a flat-intensity detector configured to detect a flat intensity of the target pixel on the basis of the contrast intensity, the flat intensity indicating a degree of smallness of change in pixel value relative to change in position in the region including and neighboring the target pixel;

an edge-intensity detector configured to detect an edge intensity of the target pixel on the basis of the contrast intensity, the edge intensity indicating a degree of largeness of change in pixel value relative to change in position in the region including and neighboring the target pixel;

a flat-weight setter configured to set a flat weight for the target pixel, the flat weight being a weight that increases as flat intensities of pixels in the region including and neighboring the target pixel increase and that decreases as the flat intensities decrease;

an edge-weight setter configured to set an edge weight for the target pixel, the edge weight being a weight that increases as edge intensities of the pixels in the region including and neighboring the target pixel increase and that decreases as the edge intensities decrease;

an attenuator configured to attenuate components in a predetermined frequency band of the first image to form a second image;

a first combiner configured to combine the first image and the second image to form a third image by adding together pixel values of pixels at corresponding positions of the first image and the second image, using weights that are based on the flat weight;

an edge enhancer configured to enhance edges in the third image to form a fourth image; and a second combiner configured to combine the first image and the fourth image by adding together pixel values of pixels at corresponding positions of the first image and the fourth image, using weights that are based on the edge weight.

10. A computer readable medium containing a computer executable program for causing the computer to execute a process comprising the steps of:

detecting a contrast intensity of a target pixel being considered in a first image, the contrast intensity indicating an intensity of contrast in a region including and neighboring the target pixel;

detecting a flat intensity of the target pixel on the basis of the contrast intensity, the flat intensity indicating a degree of smallness of change in pixel value relative to change in position in the region including and neighboring the target pixel;

detecting an edge intensity of the target pixel on the basis of the contrast intensity, the edge intensity indicating a degree of largeness of change in pixel value relative to change in position in the region including and neighboring the target pixel;

setting a flat weight for the target pixel, the flat weight being a weight that increases as flat intensities of pixels in the region including and neighboring the target pixel increase and that decreases as the flat intensities decrease;

setting an edge weight for the target pixel, the edge weight being a weight that increases as edge intensities of the pixels in the region including and neighboring the target pixel increase and that decreases as the edge intensities decrease;

attenuating components in a predetermined frequency band of the first image to form a second image;

combining the first image and the second image to form a third image by adding together pixel values of pixels at corresponding positions of the first image and the second image, using weights that are based on the flat weight;

enhancing edges in the third image to form a fourth image; and combining the first image and the fourth image by adding together pixel values of pixels at corresponding positions of the first image and the fourth image, using weights that are based on the edge weight.

* * * * *